(12) United States Patent
Kim et al.

(10) Patent No.: US 6,842,213 B2
(45) Date of Patent: Jan. 11, 2005

(54) LIQUID CRYSTAL DISPLAY

(75) Inventors: Il-Gon Kim, Suwon (KR); Woon-Yong Park, Suwon (KR); Byoung-Sun Na, Suwon (KR); Yu-Ri Song, Seoul (KR); Seung-Soo Baek, Suwon (KR); Young-Mi Tak, Seoul (KR); Sahng-Ik Jun, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/811,049

(22) Filed: Mar. 26, 2004

(65) Prior Publication Data

US 2004/0179161 A1 Sep. 16, 2004

Related U.S. Application Data

(63) Continuation of application No. 10/054,079, filed on Jan. 22, 2002, now Pat. No. 6,771,343.

(30) Foreign Application Priority Data

Apr. 6, 2001 (KR) ......................................... 2001-18149

(51) Int. Cl.[7] .......................................... G02F 1/1337
(52) U.S. Cl. ....................... 349/144; 349/129; 349/142
(58) Field of Search ............................... 349/141, 144, 349/38, 39, 142, 129

(56) References Cited

U.S. PATENT DOCUMENTS

| 6,256,080 B1 | * | 7/2001 | Colgan et al. | .............. 349/129 |
| 6,593,988 B1 | * | 7/2003 | Liu et al. | ..................... 349/129 |
| 6,600,539 B2 | * | 7/2003 | Song | .......................... 349/130 |
| 6,741,314 B2 | * | 5/2004 | Song | .......................... 349/144 |

* cited by examiner

*Primary Examiner*—Kenneth Parker
*Assistant Examiner*—David Chung
(74) *Attorney, Agent, or Firm*—F. Chau & Associates, LLC

(57) ABSTRACT

An LCD has a storage electrode wire between long sides of partitions of a pixel electrode and gate lines or data lines. A gate wire and a storage electrode wire are formed on a substrate and covered with a gate insulating layer. A data wire is formed on the gate insulating layer and covered with a passivation layer. A thin film transistor including gate, source and drain electrodes are provided on the substrate. A pixel electrode is formed on the passivation layer and connected to the drain electrode. The pixel electrode is divided into three partitions, a first one having long and short sides parallel to data lines and gate lines, respectively, and second and third ones vice versa. A storage electrode line and some storage electrodes are disposed between the long sides of the partitions and the gate or the data lines, and between the long sides of the partitions. Other storage electrodes disposed between the short sides of the partitions and the gate or the data lines are covered by the pixel electrode. A storage electrode between the short side of the first portion and the long side of the partition is spaced apart from the first partition by at least 3 $\mu$m.

9 Claims, 12 Drawing Sheets

FIG. 3B

| | TIME | POLARITY OF UPPER PIXEL | POLARITY OF LOWER PIXEL | WITH STORAGE ELECTRODE | WITHOUT STORAGE ELECTRODE |
|---|---|---|---|---|---|
| EXAMPLE 1 | Gate ON | + | + | | |
| | Gate OFF | + | − | | |
| EXAMPLE 2 | Gate ON | − | − | | |
| | Gate OFF | − | + | | |

LIQUID CRYSTAL DISPLAY

This is a continuation application of U.S. application Ser. No. 10/054,079 filed Jan. 22, 2002 now U.S. Pat. No. 6,771,343.

BACKGROUND OF THE INVENTION (a) Field of the Invention

The present invention relates to a liquid crystal display, and particularly to a vertically aligned liquid crystal display having a pixel area divided into a plurality of small domains for wide viewing angle.

(b) Description of Related Art

In general, a liquid crystal display (referred to as an "LCD" hereinafter) has an upper panel, a lower panel and a liquid crystal layer disposed therebetween. The upper panel has a common electrode, a plurality of color filters and the like, and the lower panel has a plurality of thin film transistors, a plurality of pixel electrodes connected thereto and so on. In addition, a pair of polarizers are attached to the panels. The pixel electrodes and the common electrode are applied with electrical voltages to generate electric field which varies the orientation of liquid crystal molecules. The variation of the orientation of the liquid crystal molecules changes the polarization of light incident on the liquid crystal layer after passing through one of the polarizers, thereby controlling the transmittance of the light out of the other polarizer.

One drawback of a conventional LCD is its narrow viewing angle. Several methods for widening the viewing angle have been developed. One of the methods is to align the long axes of the liquid crystal molecules vertical to the panels and to form apertures or protrusions in the pixel electrodes and/or in the common electrode facing the pixel electrodes. The domain defining members such as aperture or protrusions define domains, and the domains in turn define the alignment of the liquid crystal molecules therein.

The apertures formed in the pixel electrodes and the common electrode result in a fringe field. By using the fringe field, the tilt directions of the liquid crystal molecules are controlled to enlarge the viewing angle.

The protrusions are provided on the pixel electrodes and the common electrode formed in the upper and the lower panels. The electric field altered by the protrusions are used to control the tilt directions of the liquid crystal molecules.

Another method is by forming apertures in the pixel electrodes of the lower panel, while having protrusions on the common electrode of the upper panel. The tilt directions of the liquid crystal molecules are controlled to form domains by using the fringe field generated by the apertures and the protrusions.

In addition, gate lines and data lines provided in the lower panel and arranged in rows and columns carry scanning signals and image signals, and the pixel electrodes and the thin film transistors are disposed in rectangular areas defined by the intersections of the gate lines and the data lines. When the scanning signals and the image signals are transmitted by the gate lines and the data lines the signals influence the electric fields adjacent thereto, and the stability of the domains and the image quality deteriorate.

SUMMARY OF THE INVENTION

It is therefore an object of the present invention to provide a liquid crystal display having improved image quality by preventing electric field of a gate line and a data line from influencing on the electric field in a domain.

According to the present invention, these and other objects are accomplished by disposing a storage electrode wire between a gate line or a data line and a pixel electrode.

According to one aspect of the present invention, first, second and third signal lines are formed on a first substrate. The second signal line is insulated from and intersects the first signal line, and the third signal line is insulated from the first and the second signal lines. A pixel electrode is formed in a pixel area, which is defined by intersections of the first and the second signal lines. The pixel electrode has a plurality of partitions and a plurality of connections connecting the partitions. A switch is connected to the first signal line, the second signal line and the pixel electrode.

In addition, a common electrode and a plurality of domain defining members are formed on a second substrate. According to the present invention, a first of the partitions of the pixel electrode has a first side and a second side shorter than the first side, which are substantially parallel to the first and the second signal lines, respectively. The third signal line has a first portion located between the first side of the first partition and the first signal line adjacent to the first side of the first partition.

A second of the partitions of the pixel electrode may have a first side and a second side shorter than the first side, which are substantially parallel to the second and the first signal lines, respectively. In this case, it is preferable that the third signal line has a second portion disposed between the first sides of the second partition and the second signal line.

The second portion of the third signal line preferably overlaps in part the first sides of the partitions of the pixel electrode.

The third signal line may further have a third portion adjacent to the second sides of the partitions of the pixel electrode, and it is preferable that the second portion of the third signal line is substantially covered by the pixel electrode. In addition, the third signal line may have a fourth portion spaced apart by at least 3 μm from the second sides of the pixel electrode. The third signal line is preferably formed of the same layer as the first signal line.

Alternatively, the third signal line may further have a portion located between the partitions of the pixel electrode.

A third of the partitions of the pixel electrode may have a first side and a second side shorter than the first side, which are substantially parallel to the second and the first signal lines, respectively. In this case, the first to the third partitions are preferably arranged along the first signal lines.

Preferably, the third signal line is applied with a common voltage which is applied to the common electrode.

According to another aspect of the present invention, an LCD includes first and second panels opposite each other and a liquid crystal layer therebetween. The first panel has a first electrode, a first domain defining member and a signal wire, and the second panel has a second electrode and a second domain defining member. According to the present invention, the first and the second domain defining members define a domain where molecules of the liquid crystal layer are aligned substantially in one direction. The planar shape of the domain has a first side and a second side of being shorter than the first side. The first panel also has an interference protection wire which is located between the first side of the domain and the signal wire adjacent thereto.

Preferably, the first or second domain defining members include a plurality of partitions with a first partition disposed in one of two halves of a pixel area for further dividing into two domains the one half pixel area and a second and third partition for dividing the second half of the pixel areas into three domains. The first partition is preferably disposed in a direction transverse to the direction of the second and third partitions.

According to still another embodiment of the invention, a liquid crystal display (LCD) comprising: a gate wire and a storage electrode wire formed on a substrate and covered with a gate insulating layer; a data wire formed on the gate insulating layer and covered with a passivation layer; a pixel electrode formed on the passivation layer, the pixel electrode is divided into a plurality of partitions, wherein the storage electrode wire is disposed between the partitions and the gate or the data wires. Preferably, the storage electrode wire is spaced apart from a first partition by at least 3 μm.

BRIEF DESCRIPTION OF THE DRAWINGS

FIG. 3B shows equipotential lines of an LCD having a storage electrode of a common voltage between a gate line and a pixel electrode as shown in FIG. 3A, and those of an LCD without storage electrode.

DETAILED DESCRIPTION OF PREFERRED EMBODIMENTS

Figure 1A:
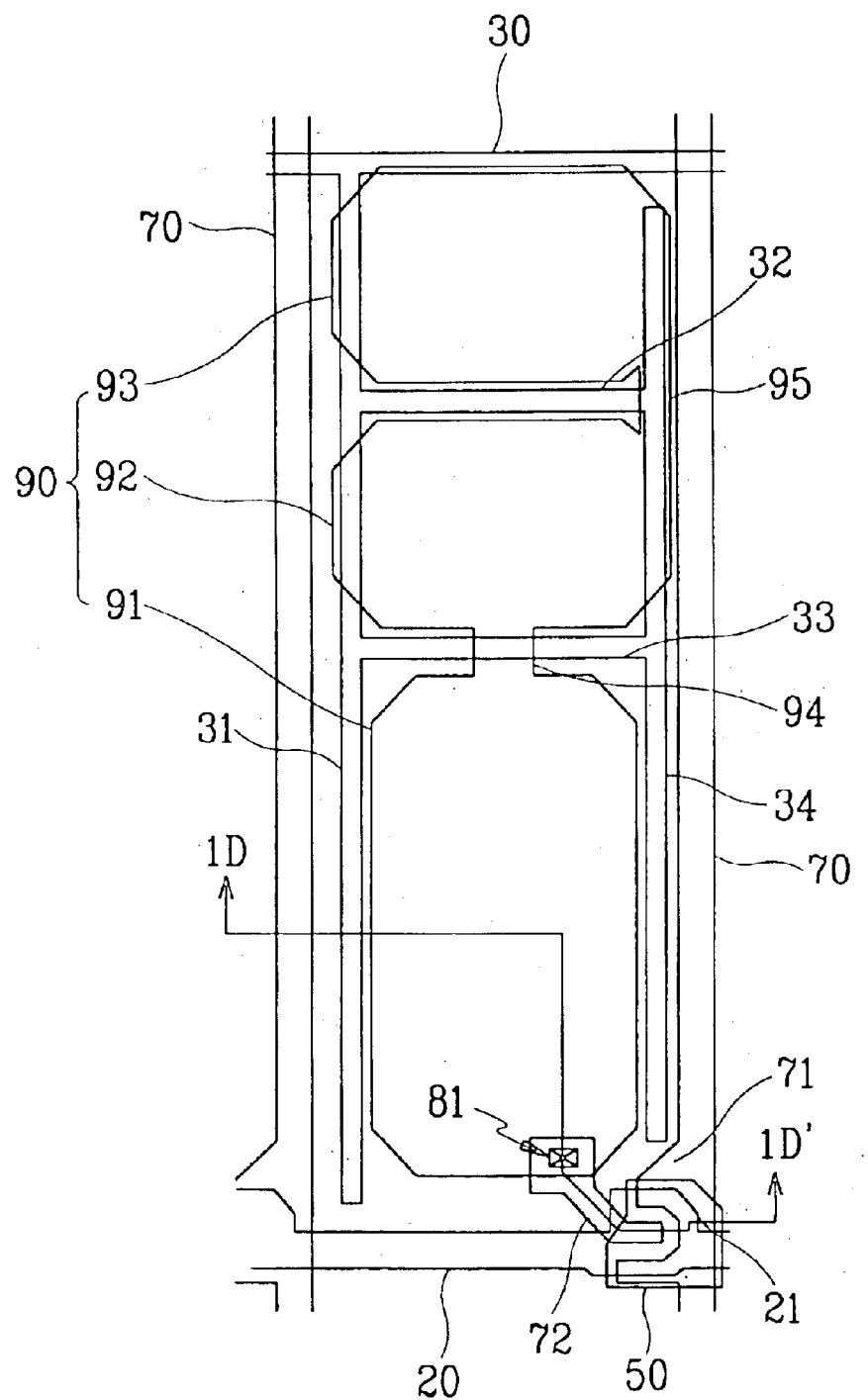
FIGS. 1A and 2A are layout views of thin film transistor array panels for LCDs according to the first and second embodiments of the present invention, respectively.

The present invention will be described more fully hereinafter with reference to the accompanying drawings, in which preferred embodiments of the invention are shown. This invention may, however, be embodied in many different forms and should not be construed as limited to the embodiments set forth herein. In the drawings, the thickness of layers and regions are exaggerated for clarity. Like numerals refer to like elements throughout. It will be understood that when an element such as a layer, region or substrate is referred to as being "on" another element, it can be directly on the other element or intervening elements may also be present. In contrast, when an element is referred to as being "directly on" another element, there are no intervening elements present.

A liquid crystal display according to a first embodiment will now be described with reference to FIGS. 1A to 1E.

Figure 1B:
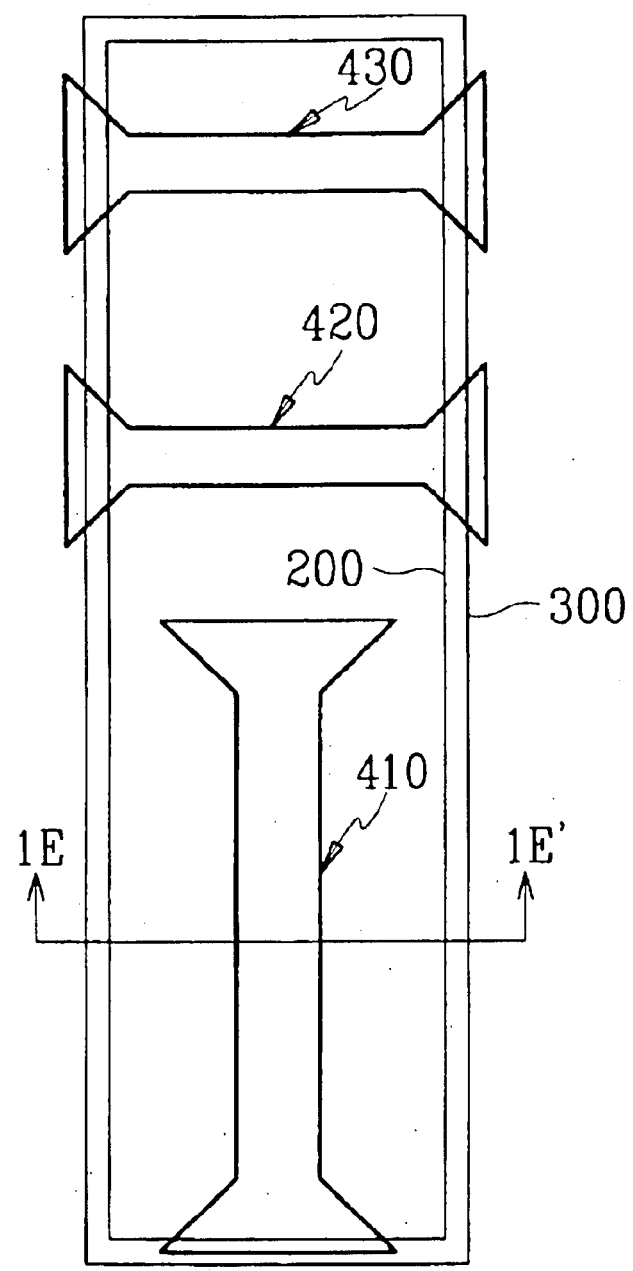
FIGS. 1B and 2B are layout views of color filter panels for LCDs according to the first and second embodiments of the present invention, respectively.
Figure 1C:
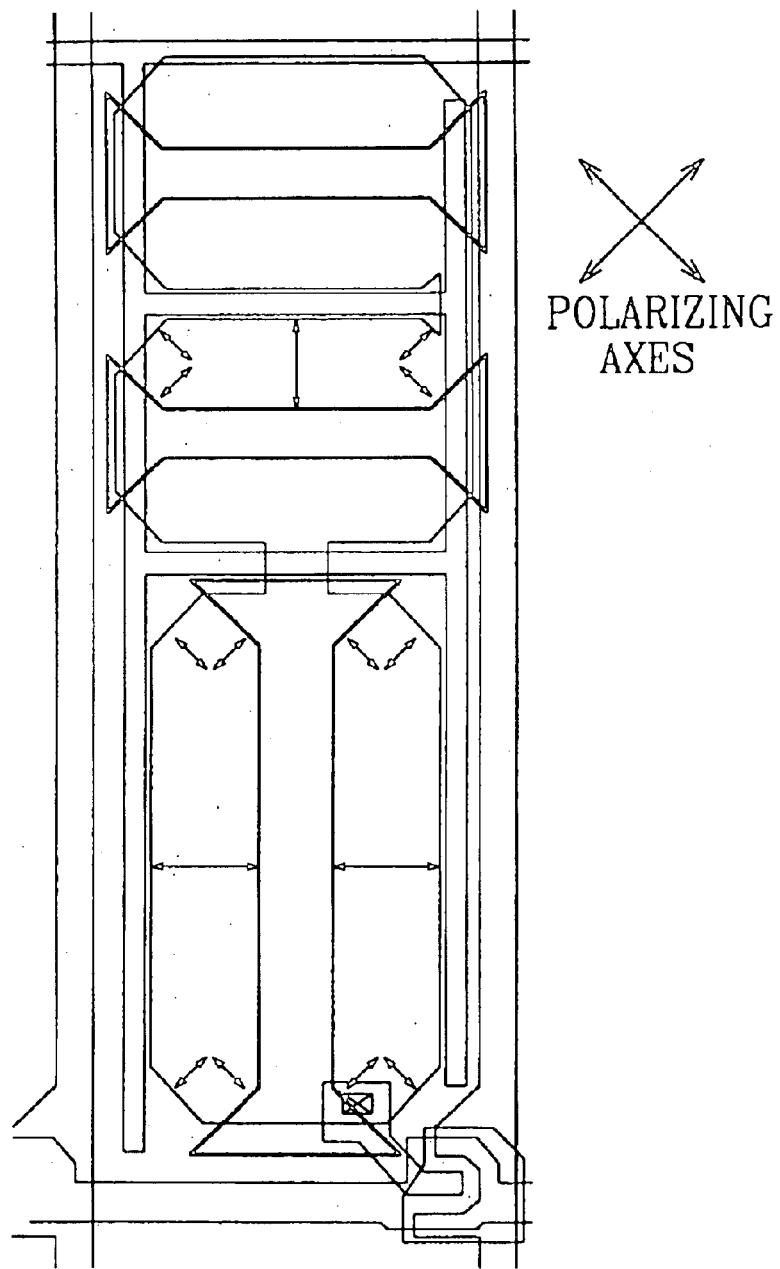
FIGS. 1C and 2C are layout views of LCDs made by assembling the thin film transistor array panels shown in FIGS. 1A and 2A and the color filter panels shown in FIGS. 1B and 2B according to the first and second embodiments of the present invention, respectively.
Figure 1D:
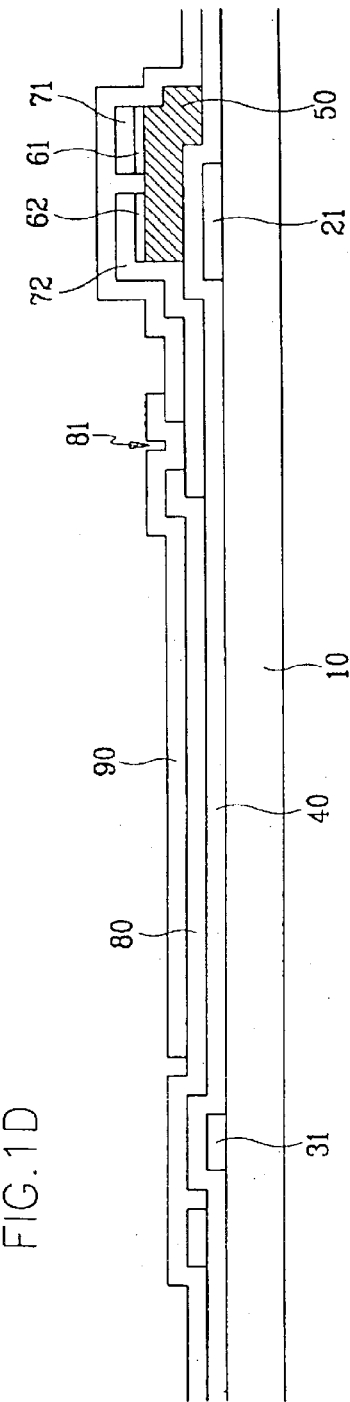
FIG. 1D is a cross-sectional view of the thin film transistor array panel taken along the line 1D–1D' of FIG. 1A.
Figure 1E:
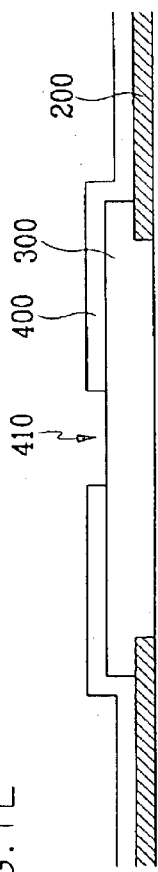
FIG. 1E is a cross-sectional view of the color filter panel taken along the line 1E–1E' of FIG. 1B.

FIGS. 1A, 1B and 1C are layout views of a thin film transistor array panel, a color filter panel and an LCD according to the first embodiment of the present invention, respectively. FIGS. 1D and 1E are cross-sectional views taken along the lines 1D–1D' and 1E–1E' of FIGS. 1A and 1B, respectively.

Referring to FIG. 1A and FIG. 1D, a thin film transistor array panel according to the present invention will be described. A gate wire 20 and 21, and a storage electrode wire 30–34 are formed on a transparent insulating substrate 10, preferably made of glass. The gate wire includes a gate line 20 extending in a transverse direction and a gate electrode 21 which is a branch of the gate line 20. The storage electrode wire includes a storage electrode line 30 extending in a direction parallel to the gate line 20, and first to fourth storage electrodes 31, 32, 33 and 34, which are branches of the storage electrode line 30. The first storage electrode 31 directly connected to the storage electrode line 30 extends in a longitudinal direction, and the second and the third storage electrodes 32 and 33 are connected to points between two opposite ends of the first storage electrode 31 and extend in the transverse direction. The fourth storage electrode 34 extends in the longitudinal direction, and the second and the third storage electrodes 32 and 33 are connected to the fourth storage electrode 34 at points between the two opposite ends of the storage electrode 34.

The gate wire 20 and 21, and the storage electrode wire 30–34 are covered with a gate insulating layer 40. A semiconductor layer 50, preferably made of amorphous silicon, is formed on a portion of the gate insulating layer 40 on the gate electrode 21. An ohmic contact layer 61 and 62, preferably made of amorphous silicon doped with N-type dopant such as phosphorus and having two separated portions 61 and 62 is formed on the semiconductor layer 50. A data wire 70, 71 and 72 is formed on the gate insulating layer 40 and the contact layer 61 and 62. The data wire includes a plurality of data lines 70 on the gate insulating layer 40, which extends in a vertical direction. The data wire further includes a source electrode 71 and a drain electrode 72 disposed on the two portions 61 and 62 of the contact layer, respectively. The source electrode 71 has a U-shaped portion. It is a branch of the data line 70 and is separated from the drain electrode 72. A portion of the semiconductor layer 50 disposed between the source and the drain electrodes 71 and 72 are exposed.

A passivation layer 80, which has a contact hole 81 exposing the drain electrode 72, is formed on the data wire 70, 71 and 72, and the exposed portion of the semiconductor layer 50. A pixel electrode 90, which is connected to the drain electrode 72 through the contact hole 81, is formed on the passivation layer 80 and located in a pixel area surrounded by pairs of the gate lines and the data lines. The pixel electrode 90 is preferably made of a transparent conductive material such as ITO (indium tin oxide) or IZO (indium zinc oxide).

The pixel electrode 90 is divided into first to third partitions 91, 92 and 93 connected via first and second connections 94 and 95. The partitions 91–93 are arranged in the longitudinal direction, and have rectangular shapes with four chamfered corners. The first partition 91 is located at the lower half part of the pixel area, which is defined by intersections of the two gate lines 20 and two data lines 70. The first partition 92 is directly connected to the drain electrode 72 through the contact hole 81 near the lower edge of the pixel electrode 90. The second and the third partitions 92 and 93 are located at the upper half part of the pixel area and connected by the second connection 95 near the data line 70. The second partition 92 is connected to the first partition 91 by the first connection 94 near the center of the pixel area. The second and the third storage electrodes 32 and 33 are located between the second and the third partitions 92 and 93 and between the first and the second partitions 91 and 92, respectively. The first and the fourth storage electrodes 31 and 34 are located between the pixel electrode 90 and the data lines 70. The long sides of the partition 91 are parallel to the data line 70, while the short sides are parallel to the gate line 20. On the contrary, the short sides of the second and third partitions 92 and 93 are parallel to the data line 70, while the long sides are parallel to the gate line 20. The second and the third partitions 92 and 93 overlap the first and the fourth storage electrodes 31 and 34, but the first partition 91 does not. In addition, the storage electrode line 30 is located between the third partition 93 and the gate line 20 adjacent thereto. It is common to apply a common potential, which is also applied to a common electrode of a color filter panel, to the storage electrode wire 30–34.

The storage electrode wire 30–34 having the common potential is disposed between the pixel electrode 90 and the data lines or the gate lines adjacent thereto. The storage electrode wire 30–34 acts to shield the electric fields in the pixel area from the interference of the electric field of the data line 70 and the gate line 20.

Next, referring to FIGS. 1B and 1E, a color filter panel according to the first embodiment of the present invention will be described.

A black matrix 200, preferably having a double-layered structure of Cr/CrO$_2$, is formed on a transparent substrate 100. The transparent substrate is preferably made of glass. The black matrix 200 defines a pixel area by enclosing the pixel area, and a color filter 300 covers the pixel area. A common electrode 400, a transparent conductor, is formed over the substrate 100, and has first, second and third apertures 410, 420 and 430. The lower half part of the pixel area is divided into two subareas arranged laterally in a transverse direction by the first aperture 410 extending in a longitudinal direction while the upper half part is divided into three subareas arranged laterally in the longitudinal direction by the second and the third apertures 420 and 430 extending in the transverse direction. Both ends of the apertures 410, 420 and 430 are enlarged to form triangular shapes, preferably isosceles triangles.

Figure 1F:
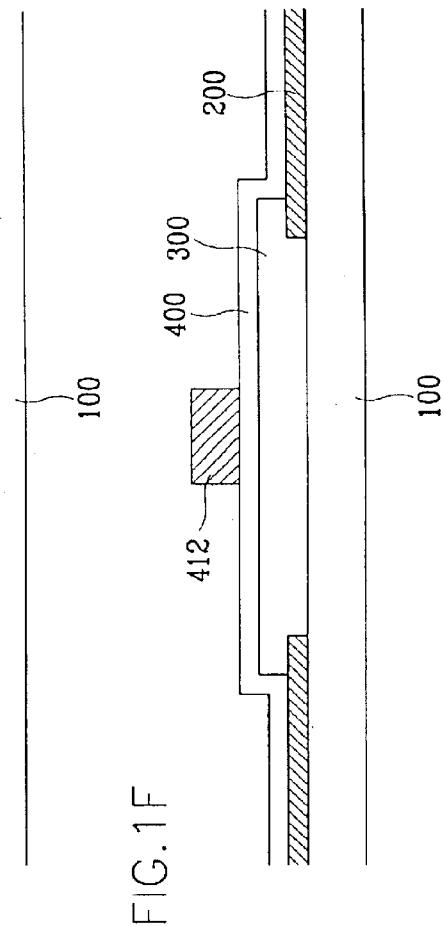
FIG. 1F shows a modified example of the color filter panel shown in FIG. 1E.

FIG. 1F shows a modified example of the color filter panel shown in FIG. 1E, where the aperture 410 shown in FIG. 1E is replaced with a protrusion 412. In this embodiment, the common electrode 400 has no aperture, and the protrusion 412 is formed on the common electrode 400. The protrusion 412 is preferably made of organic material. The black matrix 200 is preferably made of organic material, and the color filter is preferably formed on the thin film transistor array panel instead.

Next, an LCD, which is an assembly of the thin film transistor array panel shown in FIG. 1A and the color filter panel shown in FIG. 1B will be described more fully hereinafter with reference to FIG. 1C.

The LCD according to the first embodiment of the present invention is prepared by assembling the thin film transistor array panel of FIG. 1A and the color filter panel of FIG. 1B, injecting and vertically aligning liquid crystal material therebetween, and disposing two polarizers on the outer surfaces of the panels such that their polarization axes are perpendicular to each other and make 45 degrees with the sides of the partitions 91, 92 and 93.

When assembling the two panels, the pixel areas of the two panels are aligned as shown in FIG. 1C. A pixel region, a portion of the liquid crystal layer between the corresponding pixel areas of both panels, is then divided into a plurality of domains encircled by the boundaries of the partitions 91, 92 and 93 of the pixel electrode 90 of the thin film transistor array panel and the apertures 410, 420 and 430 in the common electrode 400 of the color filter panel.

If the long sides of the partitions 91, 92 and 93 of the pixel electrode 90 are adjacent to the data line 70 or the gate line 20, the storage electrode line 30 or the storage electrodes 31–34 are disposed between the long sides and the data line 70 or the gate line 20. The storage electrode line 30 or the storage electrodes 31–34 may partly overlap the pixel electrode 90. On the other hand, there is no storage electrode wire near one short side of the partition 91 of the pixel electrode 90. The storage electrode 33 is spaced apart by at least 3 μm from the partition 91, and the portions of the storage electrodes 31 and 34 near the short sides of the partitions 92 and 93 are almost fully covered by the partitions 92 and 93.

As mentioned above, the storage electrode wire 30–34 having the common potential between the long sides of the partitions and the gate lines 20 or the data lines 70 blocks the interfering effects generated by the electric fields from the gate and the data lines 20 and 70 in the domain. In addition, the storage electrode wire 30–34 near the long sides of the partitions 91–93 strengthens the fringe field in the domain, thereby obtaining more stable domains. The fringe field means a tilted electric field intentionally generated to control the tilt directions of the liquid crystal molecules.

Meanwhile, it is preferable that the liquid crystal molecules near the short sides of the partitions 91–93 gradually vary their tilt directions depending on their positions. The storage electrode wire 30–34 near the short sides of the partitions 91–93 generates an electric field for each domain, which forces the liquid crystal molecules to align in a direction and thus prevents the positional variation of the liquid crystal molecules. Accordingly, it is preferable that there is no storage electrode wire near the short sides of the partitions 91–93, or that the storage electrode wire near the short sides is covered by the pixel electrode 90.

Figure 2A:
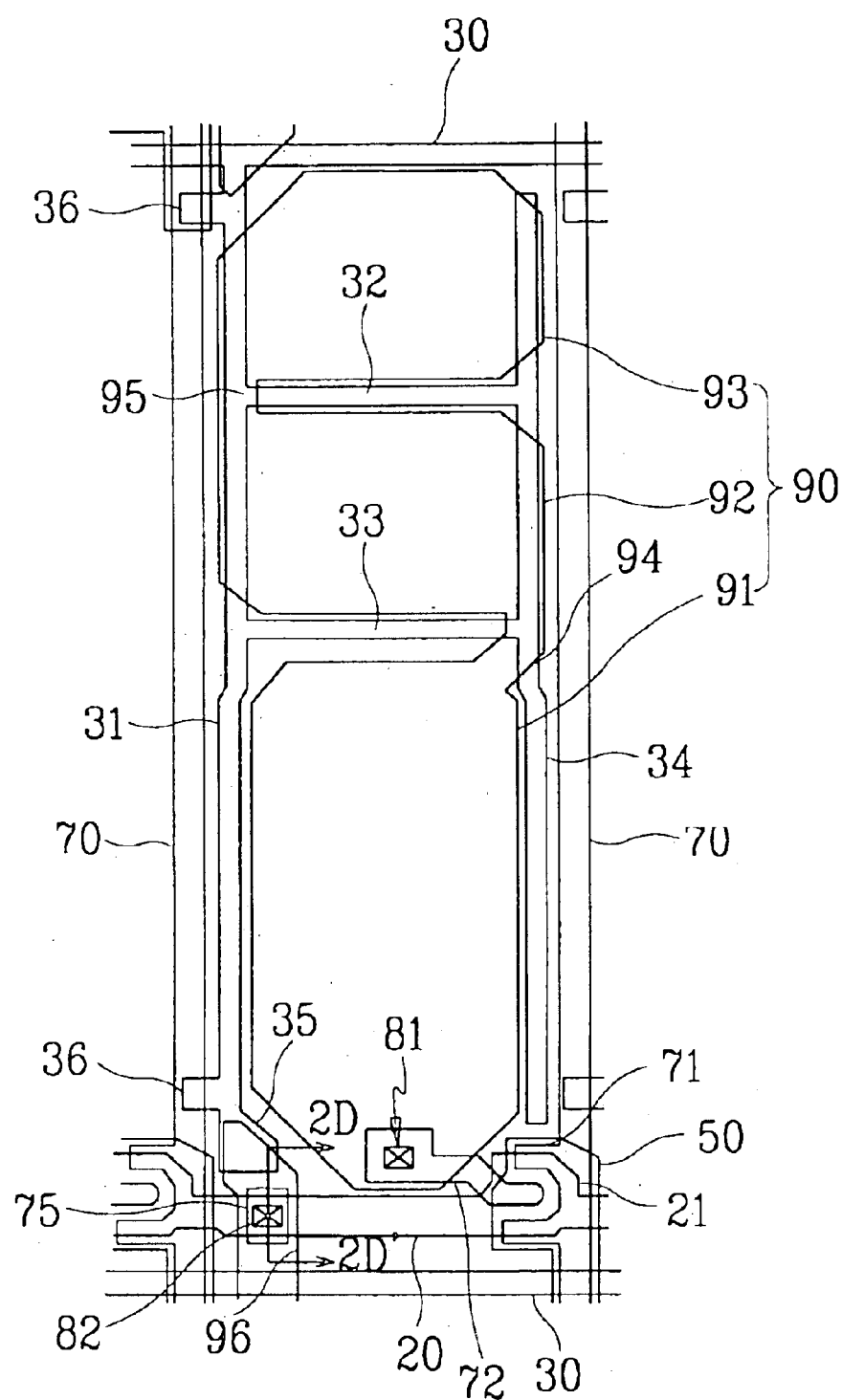
Figure 2B:
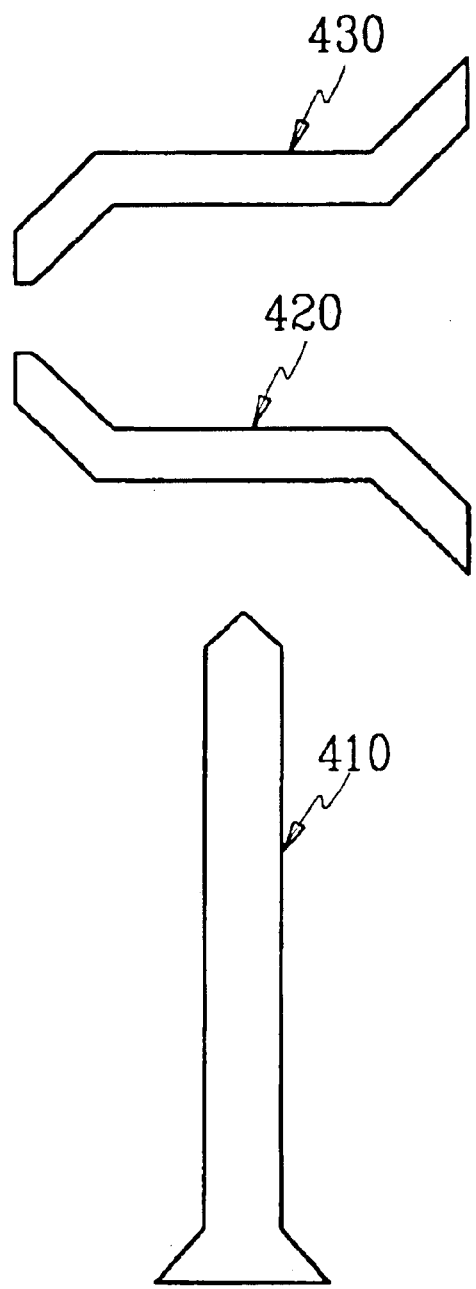
Figure 2C:
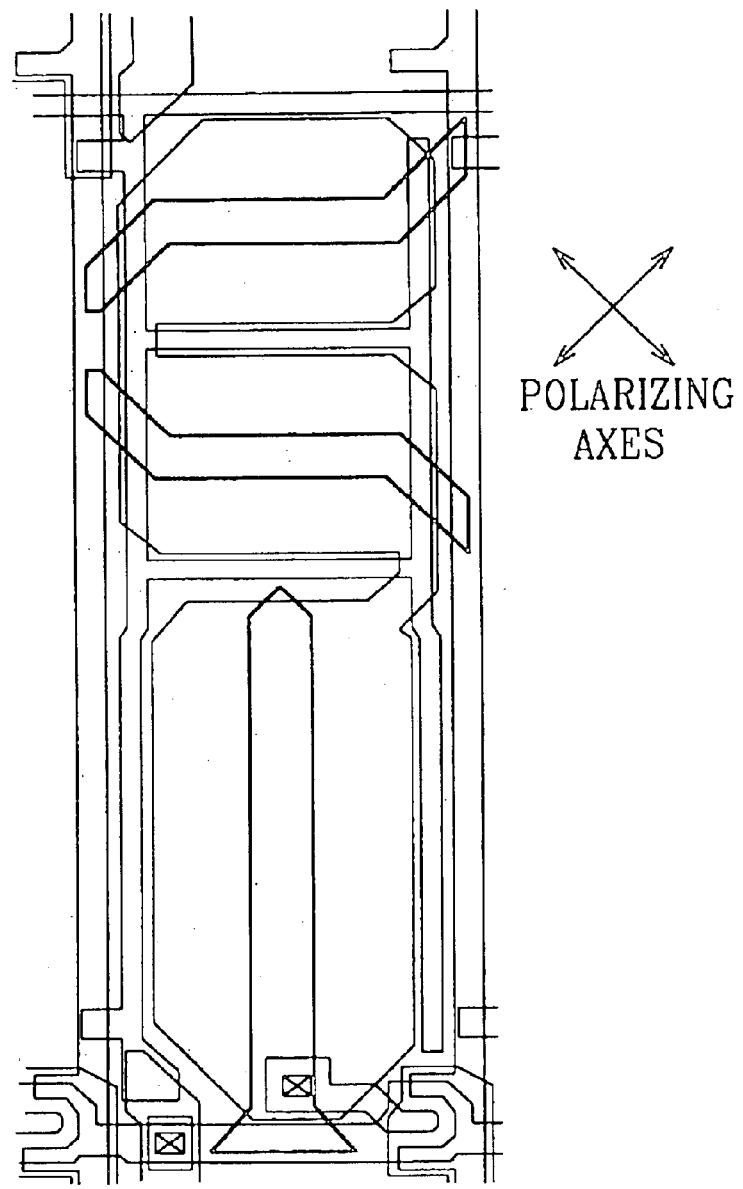
Figure 2D:
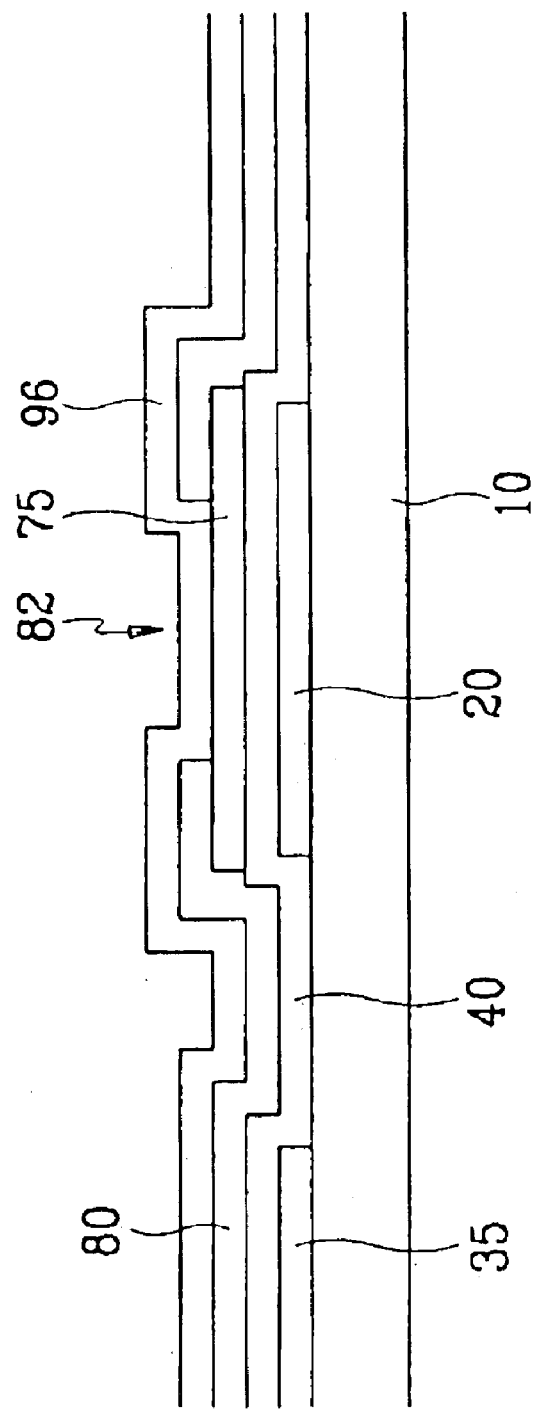
FIG. 2D is a cross-sectional view of the thin film transistor array panel taken along the line 2D–2D' of FIG. 2A.

FIGS. 2A, 2B and 2C are layout views of a thin film transistor array panel, a color filter panel and an LCD according to the second embodiment of the present invention, respectively. FIG. 2D is a cross-sectional view taken along the line 2D–2D' of FIG. 2A.

As shown in FIGS. 2A and 2C, the structure of the thin film transistor array panel of a second embodiment is similar to that of the first embodiment except for the shapes of some elements and some additional elements. In detail, a storage electrode wire according to this embodiment includes a pair of repairing portions 36, as well as first to fifth storage electrode wires 30–34.

The repairing portions 36 are branches of the first storage electrode 31, and overlap a data line 70 via a gate insulating layer (40 in FIG. 1D)(and a semiconductor layer 50). In addition, referring to FIG. 2D, the end portion 35 of the first storage electrode 31 is enlarged to overlap a repairing connection 96 via the gate insulating layer 40 and a passivation layer 80. The passivation layer 80 has a contact hole 82 exposing a buffer 75, and the buffer 75 formed on the same layer as the data line 70 is disposed on the gate insulating layer 40. The repairing connection 96 on the passivation layer 80 overlaps the buffer 75 near the end portion 35, and a storage electrode line 30 and the first storage electrode 31 adjacent thereto.

Another feature of the second embodiment is the shape of a pixel electrode 90. A first connection 94 between first and second partitions 91 and 92 is located at a corner of the partitions 91 and 92 rather than at the center thereof, and a second connection 95 between the second and third partitions 92 and 93 is disposed opposite the first connection 94.

Next, referring to FIGS. 2B and 2C, a color filter panel according to the second embodiment of the invention will be described.

As shown in FIGS. 2B and 2C, the color filter panel according to the second embodiment is substantially the same as that of the first embodiment except for the shape of the apertures 410, 420 and 430 in a common electrode (400 in FIG. 1E). In detail, a first aperture 410 in the lower half part of a pixel area has a shape like a nail having a flattening head and a pointed end. Second and third apertures 420 and 430 in the upper half part of the pixel area have two bent end portions in the opposite directions, and one pair of the facing end portions of the second and the third portions converge, while the other pair diverge.

Now, the effect of the present invention will be described hereinafter with reference to FIGS. 3A, 3B, 4A and 4B.

Figure 3A:
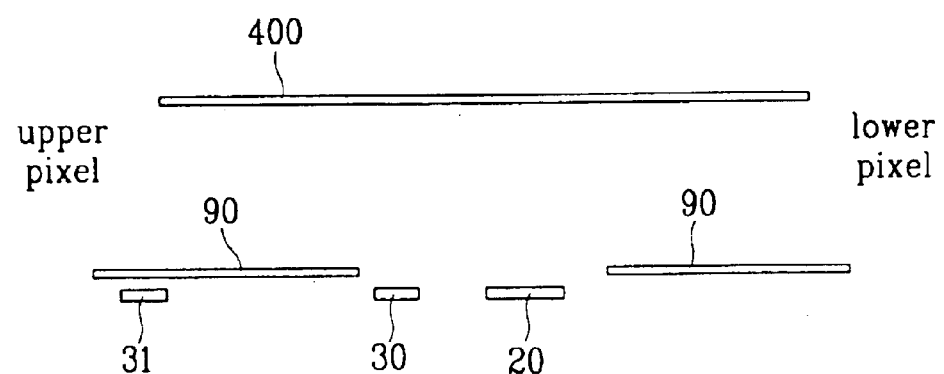
FIG. 3A shows an exemplary arrangement of conductors near a gate line of an LCD according to the present invention.

FIG. 3A shows an arrangement of conductors near a gate line according to the present invention, and FIG. 3B shows equipotential lines of LCDs with and without a storage electrode line of a common voltage, based on the arrangement shown in FIG. 3A.

FIG. 3A shows a storage electrode line 30 of a common voltage disposed between a gate line 20 and a pixel electrode 90, and upper and lower pixels with respect to the gate line 20 are illustrated to be located at left and right sides, respectively in FIG. 3A. In FIG. 3B, it is shown the equipotential lines for LCDs with and without the storage electrode line 30 of FIG. 3A when the gate is in "ON" state (i.e., when the gate line 20 has "ON" potential due to the application of the scanning signal) and when in "OFF" state (i.e., the gate line 20 has "0" potential in the absence of the scanning signal). The polarities of upper and lower pixels are the same in the "ON" state, while opposite in the "OFF" state. In case of EXAMPLE 1, the polarities of the upper and the lower pixels are positive (+) in the "ON" state, while positive (+) and negative (−), respectively, in the "OFF" state. On the contrary, in case of EXAMPLE 2, the polarities of the upper and the lower pixels are negative in the "ON" state, while negative (−) and positive (+), respectively, in the "OFF" state. With the storage electrode line 30, there is little difference in the equipotential lines between in the "ON" state and in the "OFF" state. However, without the storage electrode, there exists much difference therebetween. Accordingly, it can be seen that the storage electrode line 30, which is always applied with a common voltage, effectively blocks the interfering effects from the scanning signal transmitted through the gate line 20.

Figure 4A:
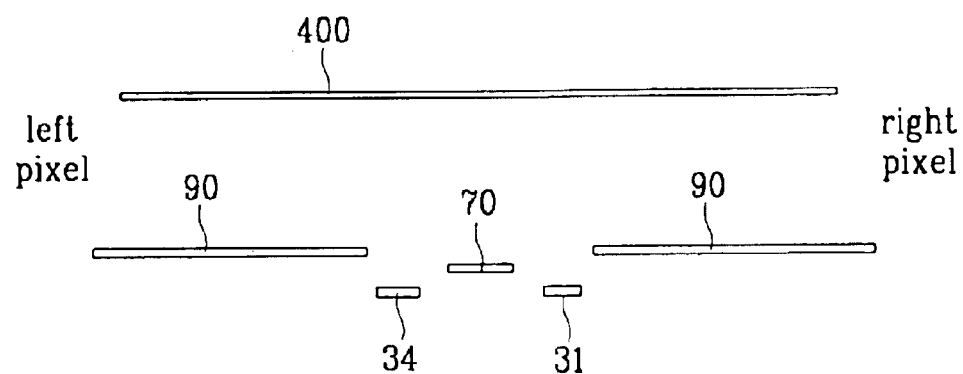
FIG. 4A shows an exemplary arrangement of conductors near a data line of an LCD according to the present invention.
Figure 4B:
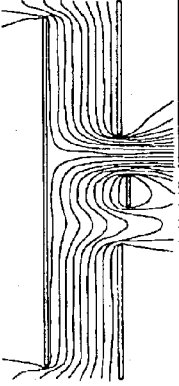
FIG. 4B shows equipotential lines of an LCD having a storage electrode of a common voltage between a data line and a pixel electrode as shown in FIG. 4A, and those of an LCD without storage electrodes.

FIG. 4A shows an arrangement of conductors near a data line according to the present invention, and FIG. 4B shows equipotential lines of LCDs with and without a storage electrode of a common voltage based on the arrangement shown in FIG. 4A.

FIG. 4A shows storage electrodes 31 and 34 disposed between a data line 70 and pixel electrodes 90. In FIG. 4B, it is shown the equipotential lines for LCDs with and without the storage electrodes 31 and 34 of FIG. 4A when the polarity of the signal in the data line 70 is positive (+) and negative (−). The polarities of the left and the right pixels are opposite. That is, in case of EXAMPLE 1, the polarities of the left and the right pixels are positive (+) and negative (−), respectively, and vice versa in case of EXAMPLE 2. With the storage electrode lines 31 and 34, there is little difference in the equipotential lines between in cases of positive (+) and negative (−) polarities of the signal in the data line 70. However, without the storage electrode, there exists much difference therebetween. Accordingly, it is understood that the storage electrode lines 31 and 34, which are always applied with a common voltage, block the interfering effects of the scanning signal transmitted through the data line 70.

Advantageously, according to the present invention, while the storage electrode wire blocks the interfering effects of the scanning signal and the image signal transmitted through the gate lines and the data lines, the common voltage applied to the storage electrode wire maintains the fringe field of the domains, thereby stabilizing the electric field of the pixel areas and improving the stability of the domains.

The number of partitions of the pixel electrode and that of the domains being divided by the domain dividing member such as apertures and the partitions can be varied if necessary. In addition, the shapes of the pixel electrode and the domain defining member can be modified in various manner by one skilled in the art and yet arrive at the same result as described above.

Although the present invention has been described herein with reference to the accompany drawings, it is to be understood that the present invention is not limited to those precise embodiments, and various other changes and modifications may be affected therein by one skilled in the art without departing from the scope or sprit of the present invention. All such changes and modifications are intended to be included within the scope of the invention as defined by the appended claims.

What is claimed is:

1. The liquid crystal display comprising:
   a first insulating substrate;
   a gate line formed on the first substrate;
   a data line insulated from and intersecting the gate line;
   a storage line insulated from the first and the data lines;
   a pixel electrode formed in a pixel area defined by intersections of the gate and the data line, the pixel electrode having a plurality of partitions and a plurality of connections connecting the partitions;
   a switch connected to the gate line, the data line and the pixel electrode;
   a second substrate facing the first substrate;
   a common electrode formed on the second substrate; and
   a plurality of domain defining members formed on the second substrate,
   wherein a first of the partitions of the pixel electrode has a first side and a second side shorter than the first side, and the storage line having a first portion located between the second side of the first partition and the data line adjacent to the second side of the first partition.

2. The liquid crystal display of claim 1, wherein a second of the partitions of the pixel electrode has a first side and a second side shorter than the first side, and the storage line further includes a second portion disposed between the first side of the second partition and the data line.

3. The liquid crystal display of claim 2, wherein at least one of the first and the second portions of the storage line partly overlaps the partitions of the pixel electrode.

4. The liquid crystal display of claim 3, wherein the storage line further has a third portion disposed between the partitions of the pixel electrode.

5. The liquid crystal display of claim 4, wherein the first portion of the storage line is spaced apart by at least 3 $\mu$m from the second sides of the first partition.

6. The liquid crystal display of claim 1, wherein the storage line is formed of the same layer as the gate line.

7. The liquid crystal display of claim 2, wherein a third of the partitions of the pixel electrode has a first side and a second side shorter than the first side, and the first to the third partitions are arranged along the data lines.

8. The liquid crystal display of claim 1, wherein the storage line is applied with a common voltage which is applied to the common electrode.

9. The liquid crystal display of claim 1, further including a pair of polarizing films holding the first and second substrate therebetween wherein the first and the second sides of the first partition make an angle of 45 degrees with the polarizing axis of the polarizing films.

* * * * *